(12) United States Patent
Hafner et al.

(10) Patent No.: US 6,881,355 B2
(45) Date of Patent: Apr. 19, 2005

(54) ANTIFREEZE

(75) Inventors: Markus Hafner, Kastl (DE); Gisela Stockbauer, Burghausen (DE); Oliver Pfueller, Nauheim (DE); Achim Stankowiak, Altötting (DE)

(73) Assignee: Clariant GmbH, Frankfurt (DE)

( * ) Notice: Subject to any disclaimer, the term of this patent is extended or adjusted under 35 U.S.C. 154(b) by 82 days.

(21) Appl. No.: 10/627,136

(22) Filed: Jul. 25, 2003

(65) Prior Publication Data

US 2004/0026656 A1 Feb. 12, 2004

(30) Foreign Application Priority Data

Aug. 2, 2002 (DE) ......................... 102 35 390
Feb. 11, 2003 (DE) ......................... 103 05 518

(51) Int. Cl.$^7$ ................................. C09K 5/00
(52) U.S. Cl. .................... 252/73; 252/71; 252/74; 252/75; 252/77
(58) Field of Search ................. 252/71, 73, 74, 252/75, 77

(56) References Cited

U.S. PATENT DOCUMENTS

| | | | | |
|---|---|---|---|---|
| 4,954,279 A | * | 9/1990 | Ma et al. ................. | 252/70 |
| 6,436,475 B1 | | 8/2002 | Adler et al. ............... | 427/358 |
| 6,585,933 B1 | * | 7/2003 | Ehrhardt et al. ............ | 422/16 |

FOREIGN PATENT DOCUMENTS

| | | |
|---|---|---|
| DE | 196 54 642 | 9/1998 |
| WO | WO 98/20186 | 5/1998 |
| WO | WO 00/22189 | 4/2000 |
| WO | WO 02/08354 | 1/2002 |

OTHER PUBLICATIONS

English abstract for WO 02/08354, Jan. 31, 2002.

* cited by examiner

Primary Examiner—Brian P Mruk
Assistant Examiner—D. G. Hamlin
(74) Attorney, Agent, or Firm—Richard P. Silverman

(57) ABSTRACT

The present invention relates to antifreeze concentrates comprising a) from 0.05 to 10% by weight of one or more sulfonated or sulfated polyglycols of the formula $$R\text{—}(O)_l\text{—}(A\text{-}O)_m\text{—}(CH_2)_k\text{—}SO_3X$$

in which
A is $C_2$- to $C_4$-alkylene,
R is H, $C_1$- to $C_{10}$-alkyl, $C_2$- to $C_{20}$-alkenyl or $C_6$- to $C_{18}$-aryl,
X is H, an alkali metal or alkaline earth metal,
k is a number from 0 to 10,
l is 0 or 1,
m is a number from 1 to 200, b) from 0.05 to 5% by weight of one or more carbamates of the formula $$R\text{—}X\text{—}\overset{\displaystyle X}{\underset{\displaystyle NH_2}{C}}$$

in which
X is O or S,
R is $C_1$- to $C_8$-alkyl or $C_6$- to $C_{18}$-aryl,
or a corresponding ammonium salt, c) from 0.05 to 5% by weight of an aliphatic or aromatic amine,
d) from 0.01 to 1% by weight of a hydrocarbon-triazole,
e) alkylene glycols to 100% by weight.

11 Claims, No Drawings

ANTIFREEZE

The present invention relates to an antifreeze concentrate for preventing corrosion of cooling and heating circulations comprising light metals, for example of light metal combustion engines (in particular magnesium and aluminum engines) for the automotive sector, based on sulfonated or sulfated polyglycols, and carbamates, triazoles, amines and other additives.

Magnesium and magnesium alloys are used as construction material especially in the aviation industry and automotive industry. The automotive industry has for years been attempting to compensate the weight increases due to more and more extras, such as air conditioning systems, safety systems, etc., in the vehicle by light-weight construction materials. In this context, reference may be made in particular to the significant differences in the density of the construction metals customary in the automotive sector:

| Steel: | 7.8 g/cm³ |
|---|---|
| Aluminum: | 2.7 g/cm³ |
| Magnesium: | 1.8 g/cm³ |

Regarding a weight reduction in the vehicle, it appears that magnesium is the ideal material. Additional positive properties of magnesium alloys, such as, for example, the good castability, suitability for die casting, the good weldability and the relatively high strength, make increasing use of magnesium or magnesium alloys understandable.

Magnesium alloys are now used both in bodywork construction and in engine construction. Thus, magnesium engines from reputable automobile manufacturers will soon reach the mass production stage.

Radiator antifreezes generally contain ethylene glycol or propylene glycol (generally: alkylene glycols) as the main component, in order to depress the freezing point.

For use in the cooling circulation, the corresponding radiator antifreeze concentrates are diluted with water. The dilution with water is intended here to ensure optimum heat removal.

Owing to the corrosiveness of the coolants described—particularly at relatively high operating temperatures—corrosion-inhibiting additives are mixed with the coolant concentrate. Particularly in the case of relatively nonnoble metals, such as aluminum or magnesium and alloys thereof, such additives are indispensable for ensuring permanent problem-free use of coolants. Magnesium is currently the most nonnoble construction material in engine construction.

In addition to the abovementioned main materials, magnesium and aluminum, further metals also have to be protected from corrosion in the cooling circulation. These are, as a rule, iron or steel, cast iron (gray cast iron), copper, brass, lead, tin, zinc and alloys thereof (e.g. soft solder).

The cooling circulation may be affected by a very wide range of types of corrosion, such as pitting, crevice corrosion or cavitation. Numerous antifreezes are already known for effective protection from the types of corrosion described, but not for use in magnesium engines.

Regarding the corrosion inhibition in the case of magnesium engines, the prior art is described in WO-02/08354, WO-00/22189 and WO-98/20186. According to this, the corrosion inhibition is based in particular on the combination of mono- and dicarboxylic acids, amides, fluorides, triazoles or thiazoles, phosphates and water-soluble molybdenum salts.

WO-02/08354 discloses antifreeze concentrates based on alkylene glycols or derivatives thereof and on glycerol, comprising from 0.05 to 10% by weight, based on the total amount of the concentrate, of one or more carboxamides and/or sulfonamides.

WO-02/20186 discloses a corrosion inhibitor comprising an aqueous solution of fluorides, citric acid, phosphates, a hydroxylamine source and an oxidizing agent.

DE-A-19654642 describes, inter alia, sulfonated organic molecules which have a straight-chain structure, are used in an aqueous solution for the treatment of metallic surfaces and are intended to serve as adhesion promoter molecules for subsequent application of a paint coat or plastics coat or of adhesives.

Since the strength of the material decreases significantly, especially in magnesium engines at relatively high operating temperatures, optimized heat removal plays a decisive role for the life of the engines. This can be achieved to a large extent by an increase in the amount of water in the ready-to-use antifreeze mixture, because water has the highest specific heat capacity of all liquid and solid substances.

However, owing to insufficient inhibition, an increased amount of water very often leads to fatal removal of metal by corrosion, because water—especially when used in magnesium engines—reacts with the metal hydrides $MgH_2$, formed as intermediates, to give the hydroxide $Mg(OH)_2$, the stability of which is decisively dependent on the pH of the medium and is very low at pH values around the neutral point.

Moreover, the use of carboxylic acids or phosphates in relatively high concentrations and at elevated temperatures often leads to considerable metal deposits which result in considerably poorer heat transfer because the contact between the metal surface and the cooling medium decreases. In this case too, overheating of the engine and further consequences derived therefrom must be expected.

Most water-soluble fluoride compounds are no longer acceptable owing to their toxicity and are therefore unsuitable for use in antifreezes.

Owing to the disadvantages described, the coolants described to date appear worthy of improvement.

It was an object of the present invention to provide an antifreeze concentrate comprising a combination of corrosion-inhibiting additives which are capable of protecting the wet metal surfaces effectively and permanently from corrosion, even at relatively high operating temperatures, without causing any significantly increased deposition of material on the metal surface owing to the type and properties of the additives.

Surprisingly, it has now been found that the class of compounds comprising the sulfonated or sulfated polyglycols is very suitable for inhibiting corrosion of magnesium and aluminum metals by a cooling medium. The novel aqueous cooling medium decisively improves the corrosion inhibition in cooling circulations of internal combustion engines, for example of automobiles, or in industrial cooling and heating circulations comprising magnesium/magnesium alloys or aluminum/aluminum alloys.

The invention therefore relates to antifreeze concentrates comprising a) from 0.05 to 10% by weight of one or more sulfonated or sulfated polyglycols of the formula

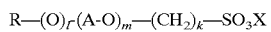

in which

A is $C_2$- to $C_4$-alkylene,

R is H, $C_1$- to $C_{10}$-alkyl, $C_2$- to $C_{20}$-alkenyl or $C_6$- to $C_{18}$-aryl, X is H, an alkali metal or alkaline earth metal,
k is a number from 0 to 10,
l is 0 or 1,
m is a number from 1 to 200,
b) from 0.05 to 5% by weight of one or more carbamates of the formula

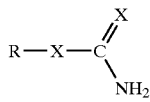

in which
X is O or S,
R is $C_1$- to $C_8$-alkyl or $C_6$- to $C_{18}$-aryl,
or a corresponding ammonium salt,
c) from 0.05 to 5% by weight of an aliphatic or aromatic amine,
d) from 0.01 to 1% by weight of a hydrocarbon-triazole,
e) alkylene glycols to 100% by weight.

In preferred embodiments, the antifreeze concentrates may furthermore additionally contain the following compounds:
f) up to 4% by weight of water,
g) from 0.05 to 2% by weight, preferably from 0.1 to 0.5% by weight, of an alkali metal silicate, if required in stabilized form, and/or
h) in each case up to 1% by weight of one or more alkali metal phosphates, alkali metal phosphonates, alkali metal borates, alkali metal nitrites or nitrates, alkali metal fluorides, alkali metal or ammonium molybdates and/or
i) from 0.05 to 5% by weight, preferably from 0.1 to 3% by weight, of a mixture of mono- and/or dicarboxylic acids having in each case from 4 to 16 carbon atoms, which are present in the form of their alkali metal or ammonium salts, and/or
j) up to 1% by weight of suitable hard water stabilizers.

All data in percent are percentages by weight.

The invention furthermore relates to the use of the abovementioned composition as a corrosion-inhibiting antifreeze in heating and cooling circulations, in particular those comprising magnesium, aluminum or alloys thereof. The use of the abovementioned composition in automotive cooling circulations is particularly preferred.

The invention furthermore relates to a process for inhibiting corrosion and providing protection from freezing in heating and cooling circulations, in particular those comprising magnesium, aluminum or alloys thereof, by using the abovementioned composition as a corrosion-inhibiting antifreeze.

Component a) is preferably present in amounts of from 0.05 to 2%. X is preferably an alkali metal. k is preferably 0 or a number from 2 to 10. If k is 0, the compounds according to a) are sulfates. If k is not 0, the compounds according to a) are sulfonates. In a preferred embodiment, the sum k+l is either 0 or from 2 to 11.

A is preferably an ethylene group or propylene group. The alkoxy group (A-O) may preferably be a pure ethylene oxide group, a pure propylene oxide group or a mixed ethylene oxide/propylene oxide group. If (A-O) is a mixed alkoxy group, a random group is preferable to a block group. If (A-O) is a mixed alkoxy group, it preferably comprises from 1 to 50 ethylene oxide groups and from 1 to 50 propylene oxide groups, in particular from 11 to 22 ethylene oxide groups and from 3 to 7 propylene oxide groups.

m is preferably a number from 1 to 50, preferably from 2 to 40, in particular from 11 to 22.

Component b) is preferably present in amounts of from 0.05 to 2% by weight. Examples of suitable carbamates are methyl carbamate, benzyl carbamate, ammonium carbamate and dimethylammonium dimethylcarbamate. In a particularly preferred embodiment of the invention, methyl carbamate is used, in particular in combination with an alkali metal salt as component a).

Suitable components c) are aliphatic and aromatic amines having preferably from 2 to 20 carbon atoms. These also include cycloaliphatic compounds. In general, these amines may also contain other functional groups, such as, for example, one or more hydroxyl groups, ether functions or sulfo groups. In a preferred embodiment, diisopropylamine (DIPA), isopropylamine or triethanolamine is used. The composition according to the invention preferably contains from 0.1 to 2% of amines.

Suitable components d) are preferably a hydrocarbon-triazole, such as tolyltriazole or benzotriazole, or suitable imidazoles or pyrimidines. The composition according to the invention preferably contains from 0.05 to 2% of triazoles.

In addition, the antifreeze concentrates according to the invention may also contain additives as described under g) to j).

The pH of the antifreeze concentrates is preferably from 5 to 12.

The present invention also relates to ready-to-use, aqueous mixtures of the antifreeze concentrate with from 10 to 90% by weight, in particular from 10 to 70% by weight, of water.

The corrosion-inhibiting antifreeze concentrate according to the invention is suitable in particular for use in light metal engines, such as aluminum engines, magnesium engines or engines comprising magnesium alloys (magnesium-aluminum, aluminum-magnesium, magnesium-rare earths, magnesium-manganese, such as, for example, AZ 91, AE 42, AM 20, AM 50 or AM 60).

EXAMPLES

In table 1, the ingredients of various antifreezes (mixed ready to use with 30 or 50% by weight of water) are compared as examples 1 to 8.

In order to determine the corrosion stability by means of a hot corrosion test, all magnesium test specimens were turned from AZ 91 (HP) pigs. The metal test specimens correspond in their dimensions to the specifications according to ASTM D 4340 or FVV. In order to create a situation for investigation which was as realistic as possible, there was no selection of the samples free of sink holes and of defects.

The conditions for the hot corrosion test are: temperature of the test liquid 80° C., test time 47 h, for concentration, cf. table 1, circulation rate 260 l/h, loading of heating surface 60 W/cm².

Chromic acid was used for cleaning the metal surfaces after the hot corrosion test ("pickling"). The change in mass of the magnesium test specimens was determined by differential weighing. The mass changes reported in table 2 are the arithmetic mean of 4 test runs in each case. Removal of as little material as possible was desirable.

TABLE 1

Basic composition of various ready-to-use radiator antifreezes

| Components [% by wt.] | Example 1 | Example 2 | Example 3 | Example 4 | Example 5 | Example 6 | Example 7 | Example 8 |
|---|---|---|---|---|---|---|---|---|
| Monoethylene glycol | 69 | 69 | 68 | 68 | 68 | 68 | 48 | 48 |
| Demineralized water | 30 | 30 | 30 | 30 | 30 | 30 | 50 | 50 |
| Triethanolamine | | | 0.5 | 0.5 | 0.5 | 0.5 | 0.5 | 0.5 |
| Tolyltriazole | | | 0.5 | 0.5 | 0.5 | 0.5 | 0.5 | 0.5 |
| Potassium fluoride | 1 | | | | | | | |
| Anthranilamide | | 1 | | | | | | |
| p-Toluenesulfonamide | | | 1 | | | | 1 | |
| Polyglycol A/22-7 | | | | 1 | | | | |
| Diolsulfonate 1200 | | | | | 1 | | | 0.5 |
| Methylcarbamate | | | | | | 1 | | 0.5 |

TABLE 2

Results of the hot corrosion test according to MTU

| Corrosion rate/ Weight change [mg/cm$^2$] | Example 1 | Example 2 | Example 3 | Example 4 | Example 5 | Example 6 | Example 7 | Example 8 |
|---|---|---|---|---|---|---|---|---|
| AZ 91 HP | −7.22 | +1.43* | −1.04 | −1.69 | −1.25 | −0.69 | −1.64 | −1.35 |
| AlSi 10 Mg wa | | | | | | −0.57 | | −0.83 |

*Very large scatter of the individual values

What is claimed is:

1. An antifreeze concentrate comprising a) from 0.05 to 10% by weight of one or more sulfonated or sulfated polyglycols of the formula $$R-(O)_L(A\text{-}O)_m-(CH_2)_k-SO_3X$$

in which

A is $C_2$- to $C_4$-alkylene,

R is H, $C_1$- to $C_{10}$-alkyl, $C_2$- to $C_{20}$-alkenyl or $C_6$- to $C_{18}$-aryl, X is H, an alkali metal or alkaline earth metal, K is a number from 0 to 10, L is 0 or 1, M is a number from 1 to 200, b) from 0.05 to 5% by weight of one or more carbamates of the formula

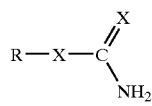

in which

X is O or S,

R is $C_1$- to $C_8$-alkyl or $C_6$- to $C_{18}$-aryl, or a corresponding ammonium salt, c) from 0.05 to 5% by weight of an aliphatic or aromatic amine, d) from 0.01 to 1% by weight of a hydrocarbon-triazole, e) alkylene glycols to 100% by weight.

2. The antifreeze concentrate of claim 1, wherein m is a number from 1 to 50.

3. The antifreeze concentrate of claim 1, wherein m is a number from 2 to 40.

4. The antifreeze concentrate of claim 1, wherein the aliphatic or aromatic amine of component c) comprises from 1 to 20 carbon atoms.

5. The antifreeze concentrate of claim 1, further comprising from 0.05 to 2% by weight of alkali metal silicates.

6. The antifreeze concentrate of claim 1, further comprising up to 1% by weight of an alkali metal compound selected from the group consisting of alkali metal phosphates, phosphonates, borates, nitrites, nitrates, fluorides, molybdates, ammonium molybdates, and mixtures thereof.

7. The antifreeze concentrate of claim 1, further comprising from 0.05 to 5% by weight of a mixture of $C_4$- to $C_{16}$-mono- and dicarboxylic acids being present in the form of the alkali metal or ammonium salt thereof.

8. The antifreeze concentrate of claim 1, wherein said antifreeze concentrate has a pH from 5 to 12.

9. An antifreeze comprising from 90 to 10% by weight of a the antifreeze concentrate of claim 1 and water to 100% by weight.

10. A method for preventing corrosion of cooling and heating systems comprising magnesium and magnesium alloys, said method comprising circulating in said cooling and heating systems an antifreeze comprising the antifreeze concentrate of claim 1.

11. The method of claim 10, wherein the cooling and heating system comprises an automobile engine.

* * * * *